United States Patent
Yamamoto et al.

(10) Patent No.: US 10,733,398 B2
(45) Date of Patent: Aug. 4, 2020

(54) DETECTION DEVICE AND DETECTION SYSTEM

(71) Applicant: Yazaki Corporation, Tokyo (JP)

(72) Inventors: Kouichi Yamamoto, Shizuoka (JP); Kazutomo Fujinami, Shizuoka (JP); Hiroshi Miyamoto, Shizuoka (JP); Ryohei Nishizaki, Shizuoka (JP); You Yanagida, Shizuoka (JP); Kunihiko Yamada, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/416,551

(22) Filed: May 20, 2019

(65) Prior Publication Data
US 2019/0362112 A1    Nov. 28, 2019

(30) Foreign Application Priority Data
May 28, 2018 (JP) ................... 2018-101233

(51) Int. Cl.
*G06K 7/10* (2006.01)
*G06K 19/07* (2006.01)
(Continued)

(52) U.S. Cl.
CPC ..... *G06K 7/10366* (2013.01); *G06K 19/0723* (2013.01); *G06K 19/07773* (2013.01); *H01Q 1/2208* (2013.01); *H01Q 1/27* (2013.01)

(58) Field of Classification Search
CPC ............. G06K 7/00; G06K 7/08; G06K 7/081
(Continued)

(56) References Cited

U.S. PATENT DOCUMENTS

| 2003/0116634 A1 | 6/2003 | Tanaka |
| 2013/0241654 A1* | 9/2013 | Mikhemar ........... H03G 1/0029 330/278 |
| 2013/0314223 A1 | 11/2013 | Masudaya et al. |

FOREIGN PATENT DOCUMENTS

| JP | 2013-049290 A | 3/2013 |
| JP | 2013-244766 A | 12/2013 |
| WO | 2009/110668 A1 | 9/2009 |

OTHER PUBLICATIONS

Gao, "Antenna-Based Passive UHF RFID Sensor Tags—Design and Application", Thesis for the degree of Doctor of Technology, Sundsvall 2013, XP055614456, ISBN: 978-91-8-710399-5, Retrieved from the Internet: URL:https://www.diva-portal.org/smash/get/diva2:649935/FULLTEXT01.pdf [retrieved on Aug. 21, 2019], Jun. 18, 2013, 102 pages total.

* cited by examiner

*Primary Examiner* — Edwyn Labaze
(74) *Attorney, Agent, or Firm* — Sughrue Mion, PLLC

(57) ABSTRACT

A detection device includes a switch unit, the switch unit performs switching to a gain reduction state in which a gain of a loop antenna is reduced or a gain non-reduction state in which the gain of the loop antenna is not reduced in correspondence with a state of a detection target. When a wavelength of an electric wave is set as λ, the switch unit includes switch terminals for reducing the gain of the loop antenna within a range K1 on the loop antenna from a first circuit terminal to a position that is spaced away from the first circuit terminal by λ/8. In addition, the switch unit includes switch terminals for reducing the gain of the loop antenna within a range on the loop antenna from a second circuit terminal to a position that is spaced away from the second circuit terminal by λ/8.

8 Claims, 9 Drawing Sheets

(51) Int. Cl.
*G06K 19/077* (2006.01)
*H01Q 1/22* (2006.01)
*H01Q 1/27* (2006.01)

(58) Field of Classification Search
USPC .................................. 235/451, 439, 435, 375
See application file for complete search history.

DETECTION DEVICE AND DETECTION SYSTEM

CROSS-REFERENCE TO RELATED APPLICATION(S)

The present application claims priority to and incorporates by reference the entire contents of Japanese Patent Application No. 2018-101233 filed in Japan on May 28, 2018.

BACKGROUND OF THE INVENTION

1. Field of the Invention

The present invention relates to a detection device and a detection system.

2. Description of the Related Art

In the related art, as a detection device, for example, Japanese Patent Application Laid-open No. 2013-244766 discloses a seat belt side device that detects attachment and detachment of a seat belt of a vehicle. The seat belt side device includes a detection switch that is provided in a buckle portion of the seat belt and is turned on when a tongue portion of the seat belt is attached to the buckle portion, and an RFID tag that transmits an attachment signal of the seat belt in a case where the detection switch is turned on.

However, in the seat belt side device described in Japanese Patent Application Laid-open No. 2013-244766, for example, even in a case where the tongue portion of the seat belt is not attached to the buckle portion and the detection switch is in an off state, there is a concern that an attachment signal of the seat belt is transmitted and error detection is performed, and thus there is room for a further improvement from the viewpoint of the concern.

SUMMARY OF THE INVENTION

Here, the invention has been made in consideration of such circumstances, and an object thereof is to provide a detection device and a detection system which are capable of improving detection accuracy.

In order to solve the above mentioned problem and achieve the object, a detection device according to one aspect of the present invention includes an antenna that transmits and receives an electric wave including a signal; a signal output unit that includes a first circuit terminal and a second circuit terminal which are connected to the antenna, operates by using a power supply signal included in the signal that is received by the antenna as power, and outputs a detection signal to the antenna; and a gain reduction unit that performs switching to a gain reduction state in which a gain of the antenna is reduced or a gain non-reduction state in which the gain of the antenna is not reduced in correspondence with a state of a detection target, wherein when a wavelength of the electric wave is set as $\lambda$, the gain reduction unit includes a first operation point for reducing the gain of the antenna within a range on the antenna from the first circuit terminal to a position that is spaced away from the first circuit terminal by $\lambda/8$ along a first extension direction of the antenna, and a second operation point for reducing the gain of the antenna within a range on the antenna from the second circuit terminal to a position that is spaced away from the second circuit terminal by $\lambda/8$ along a second extension direction of the antenna.

According to another aspect of the present invention, in the detection device, it is preferable that the first and second operation points are operation points for setting the signal output unit and the antenna to a conduction state or a non-conduction state.

According to still another aspect of the present invention, in the detection device, it is preferable that the gain reduction unit includes a first switch circuit that is capable of switching a first terminal and a second terminal as the first operation point to an electrical connection state or an electrical non-connection state, and a second switch circuit that is capable of switching a third terminal and a fourth terminal as the second operation point to the electrical connection state or the electrical non-connection state, and the gain non-reduction state in which the first terminal and the second terminal are set to the connection state, and the third terminal and the fourth terminal are set to the connection state, and the gain reduction state in which the first terminal and the second terminal are set to the non-connection state, and the third terminal and the fourth terminal are set to the non-connection state are capable of being switched from each other.

According to still another aspect of the present invention, in the detection device, it is preferable that the gain reduction unit includes a first capacitor circuit capable of switching a first flat plate and a second flat plate as the first operation point to an electricity storage possible state or an electricity storage impossible state, and a second capacitor circuit capable of switching a third plate and a fourth plate as the second operation point to the electricity storage possible state or the electricity storage impossible state, and the gain non-reduction state in which the first flat plate and the second flat plate are set to the electricity storage possible state and the third flat plate and the fourth flat plate are set to the electricity storage possible state, and the gain reduction state in which the first flat plate and the second flat plate are set to the electricity storage impossible state and the third flat plate and the fourth flat plate are set to the electricity storage impossible state are capable of being switched from each other.

According to still another aspect of the present invention, in the detection device, it is preferable that the gain reduction unit includes a third switch circuit capable of switching the first operation point and the second operation point to an electrical connection state or an electrical non-connection state, and the third switch circuit is capable of switching the gain non-reduction state in which the first operation point and the second operation point are set to the non-connection state, and the gain reduction state in which the first operation point and the second operation point are set to the connection state from each other.

In order to achieve the object, a detection system according to still another aspect of the present invention includes a reading device that transmits and receives an electric wave including a signal, and transmits a transmission signal including at least a power supply signal; a detection device including an antenna that transmits and receives a signal to and from the reading device, a signal output unit that includes a first circuit terminal and a second circuit terminal which are connected to the antenna, operates by using a power supply signal included in the signal that is received by the antenna as power, and outputs a detection signal to the antenna, and a gain reduction unit that performs switching to a gain reduction state in which a gain of the antenna is reduced or a gain non-reduction state in which the gain of the antenna is not reduced in correspondence with a state of a detection target; and a determination unit that is connected to the reading device, and determines a state of the detection target on the basis of the detection signal that is received by the reading device, wherein when a wavelength of the electric wave is set as λ, the gain reduction unit includes a first operation point for reducing the gain of the antenna within a range on the antenna from the first circuit terminal to a position that is spaced away from the first circuit terminal by λ/8 along a first extension direction of the antenna, and a second operation point for reducing the gain of the antenna within a range on the antenna from the second circuit terminal to a position that is spaced away from the second circuit terminal by λ/8 along a second extension direction of the antenna.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes (embodiments) for carrying out the invention will be described in detail with reference to the accompanying drawings. The invention is not limited by the contents described in the following embodiments. In addition, constituent elements to be described below include constituent elements which can be easily assumed by those skilled in the art, and substantially the same constituent elements. In addition, the following configurations can be appropriately combined. In addition, various omissions, substitutions, and modifications of configurations can be made in a range without departing from the gist of the invention.

First Embodiment

A detection system 1 and a detection device 20 according to a first embodiment will be described. The detection system 1 determines a state of a detection target on the basis of a detection result of the detection device 20. For example, the detection system 1 is provided in a vehicle 2, and determines a state of a detection target in the vehicle 2. For example, the detection system 1 determines a motion of an occupant due to seating of the occupant, and the like, but there is no limitation thereto. Hereinafter, the detection system 1 will be described in detail.

Figure 1:
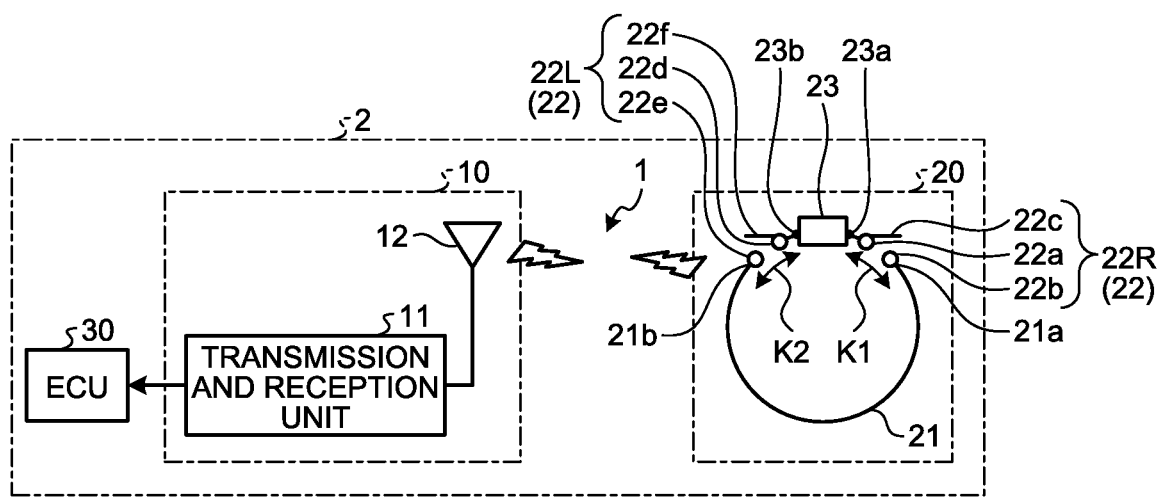
FIG. 1 is a schematic view illustrating a configuration example of a detection system according to a first embodiment.

As illustrated in FIG. 1, the detection system 1 includes a radio frequency identifier (RFID) reader 10 as a reading device, a plurality of the detection devices 20, and an electronic control unit (ECU) 30 as a determination unit. Here, the detection system 1 performs short-range radio communication by using a communication technology such as the RFID and a near field communication (NFC). Furthermore, the detection system 1 is not limited to the RFID or the NFC as long as the communication technology is a technology that performs the short-range radio communication.

Figure 2:
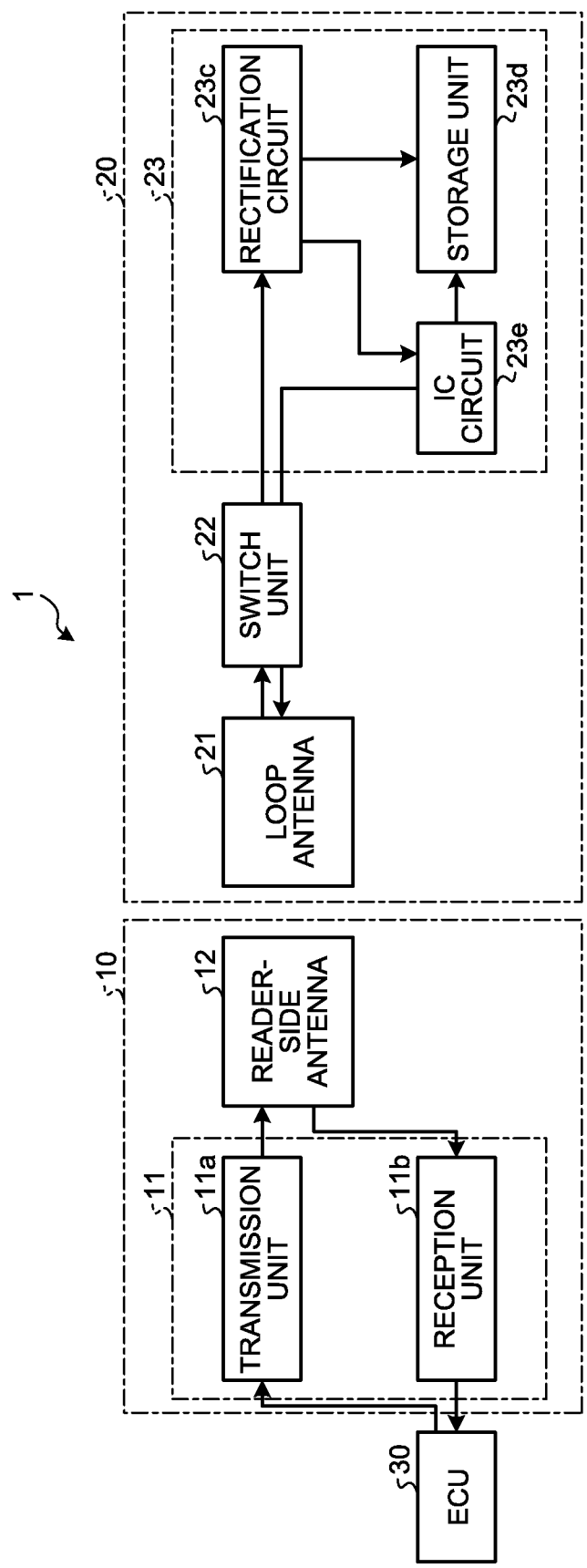
FIG. 2 is a block diagram illustrating a configuration example of the detection system according to the first embodiment.

The RFID reader 10 is a reading device that transmits and receives a signal. The RFID reader 10 is provided in the vehicle 2, for example, an AV console, a meter, a room lamp, a window glass, a sun loop, and the like. For example, the RFID reader 10 transmits a transmission signal including a power supply signal, and a carrier wave for transmitting a signal by the detection devices 20. In addition, the RFID reader 10 receives a detection signal from the detection device 20. As illustrated in FIG. 2, the RFID reader 10 includes a transmission and reception unit 11 and a reader-side antenna 12. The transmission and reception unit 11 includes a transmission unit 11a and a reception unit 11b.

The transmission unit 11a is a circuit that is connected to the reader-side antenna 12 and transmits an electric wave including a signal. For example, the transmission unit 11a outputs a transmission signal, which includes the power supply signal and the carrier wave for transmitting a signal by the detection devices 20, to the reader-side antenna 12. Furthermore, the transmission signal may include a command signal as a command and the like in addition to the power supply signal and the carrier wave.

The reception unit 11b is a circuit that is connected to the reader-side antenna 12 and receives an electric wave including a signal. The reception unit 11b receives a detection signal transmitted from the detection devices 20 through the reader-side antenna 12. The reception unit 11b demodulates the detection signal that is received, and outputs the resultant signal to the ECU 30.

The reader-side antenna 12 transmits and receives an electric wave including a signal. The reader-side antenna 12 is connected to the transmission unit 11a, and transmits a transmission signal including the power supply signal that is output from the transmission unit 11a and a carrier wave to the detection devices 20. In addition, the reader-side antenna 12 receives a detection signal from the detection devices 20, and outputs the detection signal that is received to the reception unit 11b.

Figure 3:
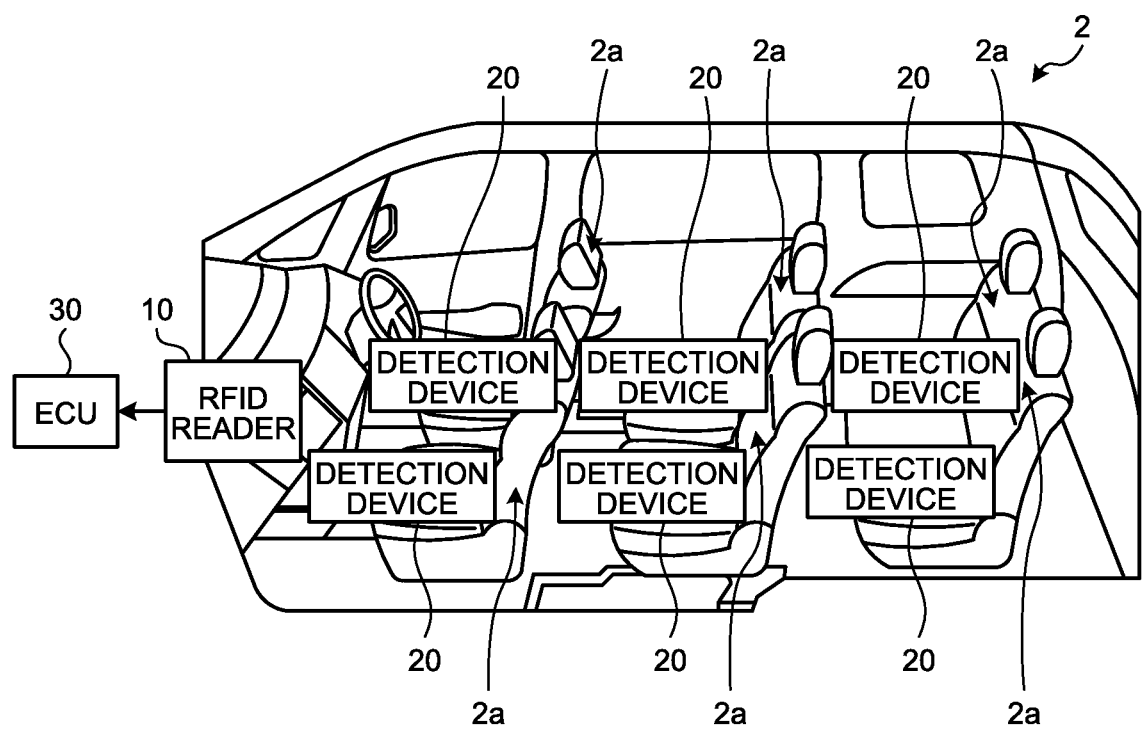
FIG. 3 is a schematic view illustrating an installation example of the detection system according to the first embodiment.
Figure 4:
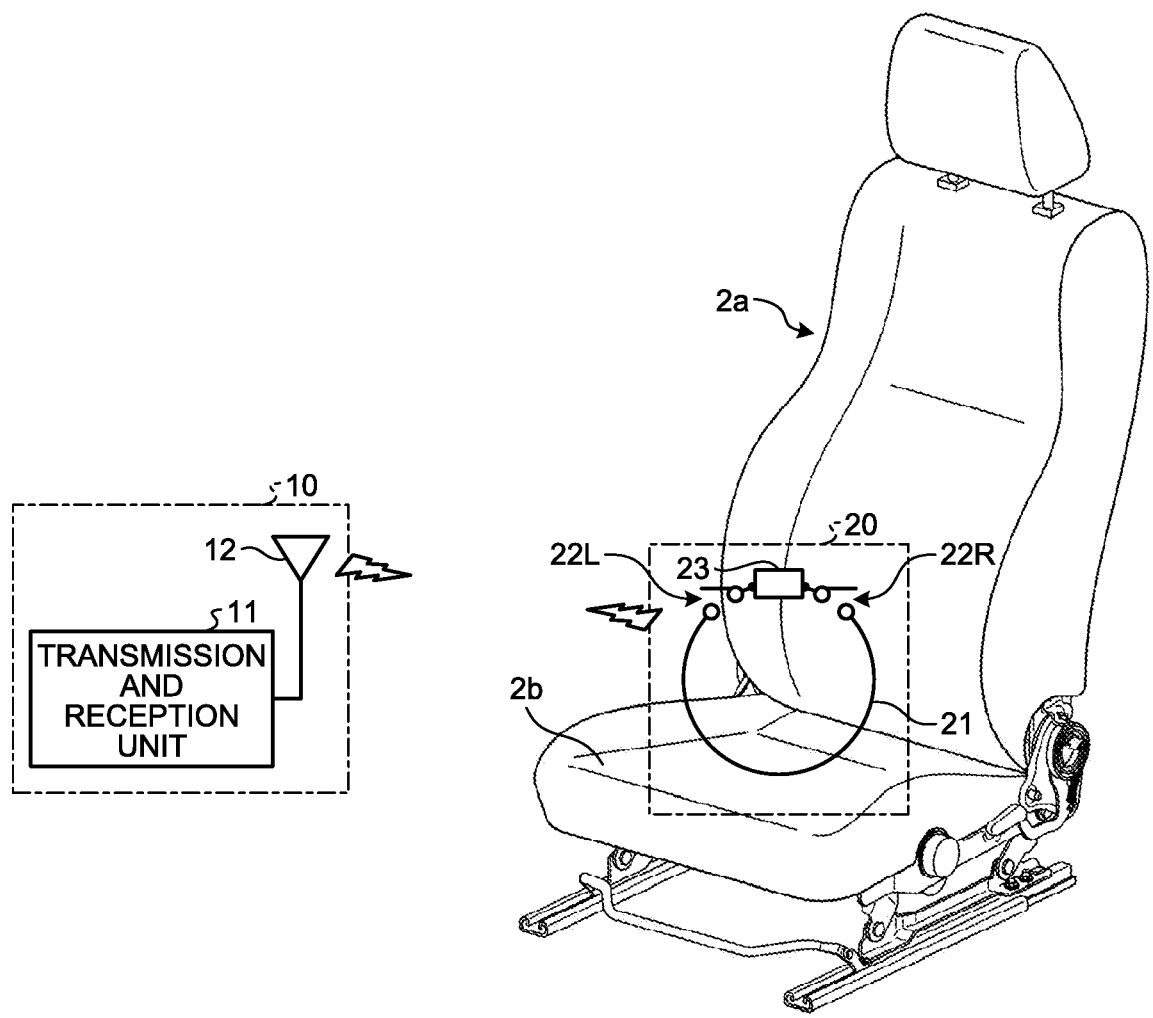
FIG. 4 is a schematic view illustrating an installation example of a detection device according to the first embodiment.

The detection devices 20 are devices which are provided in the vehicle 2 and transmit the detection signal to the RFID reader 10. The detection devices 20 are devices which use a passive-type RFID that is activated by using the power supply signal (also referred to as power) transmitted from the RFID reader 10 as power. The detection devices 20 are respectively provided at sites different from each other in the vehicle 2. For example, as illustrated in FIG. 3 and FIG. 4, the detection devices 20 are respectively provided a plurality of seats 2a of the vehicle 2. For example, the detection devices 20 are provided at seating surface portions 2b of the seats 2a.

Each of the detection devices 20 includes a loop antenna 21 as an antenna, a switch unit 22 as a gain reduction unit, and an RFID detection circuit 23 as a signal output unit. The loop antenna 21 transmits and receives a signal to and from the RFID reader 10. The loop antenna 21 is formed by winding an antenna conductor in an annular shape once or a plurality of times. The loop antenna 21 includes a starting end 21a on a winding initiation side, and a termination end 21b on a winding termination side (refer to FIG. 1). The loop antenna 21 is connected to the RFID detection circuit 23 through the switch unit 22. For example, in the loop antenna 21, the starting end 21a is connected to a first switch circuit 22R to be described later, and the termination end 21b is connected to a second switch circuit 22L to be described later. In a case where the first and second switch circuits 22R and 22L are in a connection state (turned on), the loop antenna 21 receives a transmission signal including the power supply signal transmitted from the RFID reader 10 and the carrier wave. In addition, the loop antenna 21 outputs the transmission signal that is received to the RFID detection circuit 23 through the first and second switch circuits 22R and 22L. In addition, the loop antenna 21 transmits a detection signal, which is output from the RFID detection circuit 23 through the first and second switch circuits 22R and 22L, to the RFID reader 10. On the other hand, in a case where the first and second switch circuits 22R and 22L are in a non-connection state (OFF), the loop antenna 21 does not receive the transmission signal including the power supply signal transmitted from the RFID reader 10 and the carrier wave.

The switch unit 22 is a switch of a press button type, a slide type, or the like. The switch unit 22 includes the first switch circuit 22R and the second switch circuit 22L. The first switch circuit 22R switches electric connection to ON or OFF. The first switch circuit 22R is provided between a first circuit terminal 23a of the RFID detection circuit 23 and the starting end 21a of the loop antenna 21. The first switch circuit 22R includes a switch terminal 22a as a first terminal, a switch terminal 22b as a second terminal, and a switching bar 22c. The switch terminals 22a and 22b function as a first operation point for reducing a gain of the loop antenna 21. The switch terminals 22a and 22b are located within a range K1 on the loop antenna 21 from the first circuit terminal 23a of the RFID detection circuit 23 to a position spaced away from the first circuit terminal 23a by $\lambda/8$ along a first extension direction of the loop antenna 21. Here, "$\lambda$" is a wavelength of an electric wave that is received by the loop antenna 21. The switch terminal 22a is connected to the first circuit terminal 23a of the RFID detection circuit 23. The switch terminal 22b is connected to the starting end 21a of the loop antenna 21. The switching bar 22c switches the switch terminals 22a and 22b to an electrical connection state (ON) or an electrical non-connection state (OFF). That is, the switching bar 22c switches the first circuit terminal 23a of the RFID detection circuit 23 and the starting end 21a of the loop antenna 21 to a conduction state or a non-conduction state.

The second switch circuit 22L switches electrical connection to ON or OFF. The second switch circuit 22L is provided between a second circuit terminal 23b of the RFID detection circuit 23 and the termination end 21b of the loop antenna 21. The second switch circuit 22L includes a switch terminal 22d as a third terminal, a switch terminal 22e as a fourth terminal, and a switching bar 22f. The switch terminals 22d and 22e function as a second operation point for reducing the gain of the loop antenna 21. The switch terminals 22d and 22e are located within a range K2 on the loop antenna 21 from the second circuit terminal 23b of the RFID detection circuit 23 to a position spaced away from the second circuit terminal 23b by $\lambda/8$ along a second extension direction of the loop antenna 21. The switch terminal 22d is connected to the second circuit terminal 23b of the RFID detection circuit 23. The switch terminal 22e is connected to the termination end 21b of the loop antenna 21. The switching bar 22f switches the switch terminals 22d and 22e to an electrical connection state (ON) or an electrical non-connection state (OFF). That is, the switching bar 22f switches the second circuit terminal 23b of the RFID detection circuit 23 and the termination end 21b of the loop antenna 21 to a conduction state or a non-conduction state.

In a case where an external force due to a motion of an occupant who is a detection target is applied, the switch unit 22 sets the first and second switch circuits 22R and 22L to either ON or OFF. In addition, in a case where an external force due to a motion of the occupant is not applied, the switch unit 22 sets the first and second switch circuits 22R and 22L to the other side between ON and OFF. In the first embodiment, the switch unit 22 is turned ON in a case where an external force is applied, and is turned OFF in a case where the external force is not applied (a momentary operation). For example, in a case where the occupant sits on the seat 2a, the switch unit 22 is switched to ON due to a pressure of the occupant, and in a case where the occupant does not sit on the seat 2a, a pressure of the occupant is released, and thus the switch unit 22 is switched to OFF.

For example, in a case where the occupant does not sit on the seat 2a, the switch unit 22 sets the switch terminals 22a and 22b of the first switch circuit 22R to a non-connection state (OFF), and sets the switch terminals 22d and 22e of the second switch circuit 22L to a non-connection state (OFF), thereby performing switching to a gain reduction state in which the gain of the loop antenna 21 is reduced. That is, in a case where the occupant does not sit on the seat 2a, the switch unit 22 switches the first and second switch circuits 22R and 22L to OFF to set antenna matching between the RFID detection circuit 23 and the loop antenna 21 to a mismatching state. In other words, the switch unit 22 switches the first and second switch circuits 22R and 22L to OFF to set impedance of the RFID detection circuit 23 and the loop antenna 21 to mismatching. According to this, in the detection device 20, in a case where occupant does not sit on the seat 2a, reception sensitivity is lowered, and thus the RFID detection circuit 23 may not operate.

On the other hand, in a case where the occupant sits on the seat 2a, the switch unit 22 switches the switch terminals 22a and 22b of the first switch circuit 22R to a connection state (ON), and switches the switch terminals 22d and 22e of the second switch circuit 22L to a connection state (ON), thereby performing switching to a gain non-reduction state in which the gain of the loop antenna 21 is not reduced. That is, in a case where the occupant sits on the seat 2a, the switch unit 22 switches the first and second switch circuits 22R and 22L to ON to set antenna matching between the RFID detection circuit 23 and the loop antenna 21 to a matching state. In other words, the switch unit 22 switches the first and second switch circuits 22R and 22L to ON to set impedance of the RFID detection circuit 23 and the loop antenna 21 to matching. According to this, in the detection device 20, in a case where the occupant sits on the seat 2a, reception sensitivity is not lowered, and thus it is possible to operate the RFID detection circuit 23 by the power supply signal transmitted from the RFID reader 10.

The RFID detection circuit 23 is a circuit that outputs a detection signal. Here, the detection signal is a signal including an identifier (for example, a number, a symbol, or the like) that is different in each of the detection devices 20. The RFID detection circuit 23 operates by using a power supply signal transmitted from the RFID reader 10 as power, and generates a detection signal. For example, the RFID detection circuit 23 includes the first and second circuit terminals 23a and 23b, a rectification circuit 23c, a storage unit 23d, and an IC circuit 23e. The first and second circuit terminals 23a and 23b are portions which are electrically connected to an external device. The first circuit terminal 23a is connected to the switch terminal 22a of the first switch circuit 22R, and the second circuit terminal 23b is connected to the switch terminal 22d of the second switch circuit 22L.

The rectification circuit 23c is connected to the loop antenna 21 through the first and second switch circuits 22R and 22L, and the like, and generates DC power by rectifying AC power (power supply signal) output from the loop antenna 21. The rectification circuit 23c is connected to the storage unit 23d and the IC circuit 23e, and supplies DC power that is generated to the storage unit 23d and the IC circuit 23e through a smoothing circuit (not illustrated).

The storage unit 23d is a circuit that stores an identifier that is different in each of the detection devices 20. The storage unit 23d is connected to the IC circuit 23e, and the identifier is referenced by the IC circuit 23e.

The IC circuit 23e is connected to the storage unit 23d and the loop antenna 21, acquires an identifier that is stored in the storage unit 23d, and outputs a detection signal that is obtained by modulating a carrier wave on the basis of the identifier that is acquired to the loop antenna 21 through the first and second switch circuits 22R and 22L, and the like.

The ECU 30 is an electronic circuit that controls the entirety of the vehicle 2. The ECU 30 is constituted by an electronic circuit that mainly includes a known microcomputer including a CPU, a ROM and a RAM which constitute a memory, and an interface. For example, the ECU 30 is connected to the RFID reader 10 and determines a state of a detection target in the vehicle 2 on the basis of a detection signal that is received by the RFID reader 10. The ECU 30 correlates an identifier that is included in the detection signal, and a state of a detection target in the vehicle 2 in advance. For example, the ECU 30 correlates identifiers different from each other and a plurality of the seats 2a of the vehicle 2 with each other. According to this, the ECU 30 can determine a state of each of the seats 2a on the basis of the identifier. The ECU 30 controls the transmission unit 11a to transmit the transmission signal including the power supply signal and the carrier wave to the detection device 20 at a predetermined interval (for example, at an interval of one second).

Figure 5:
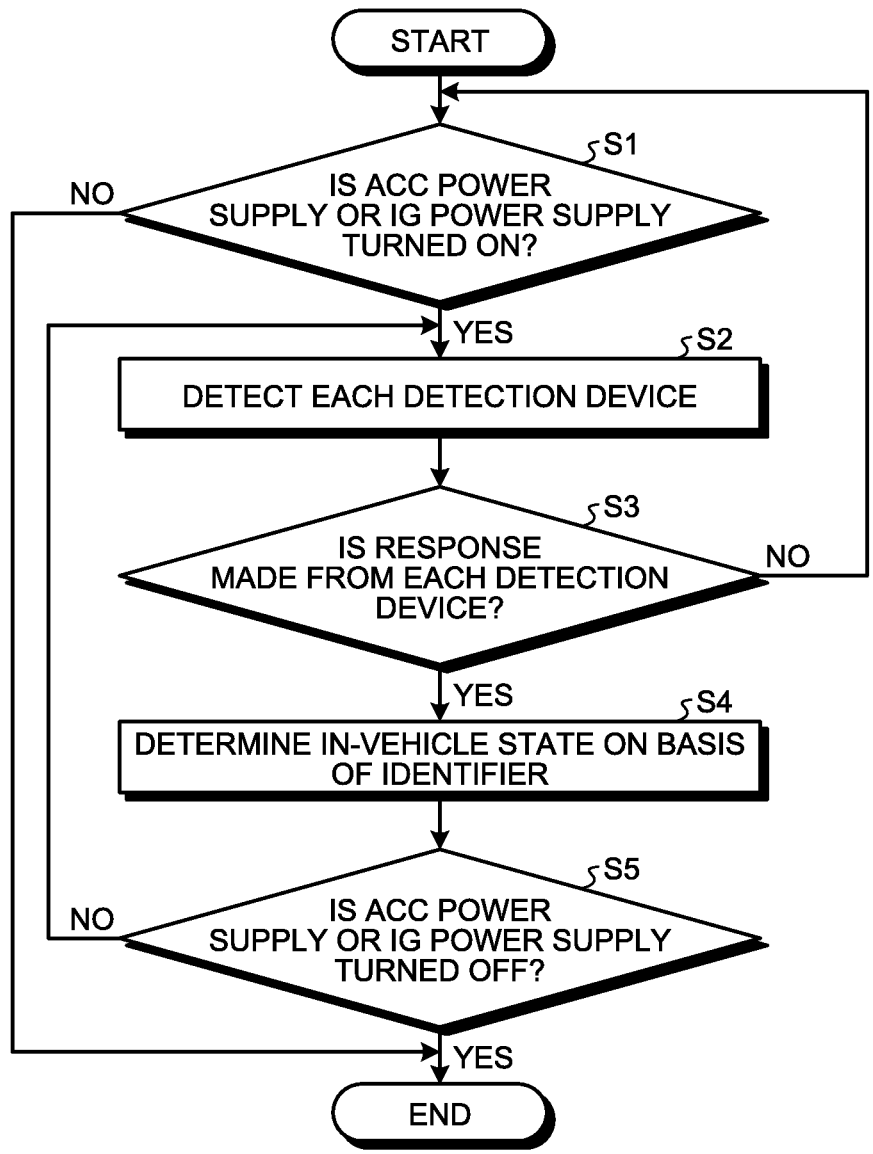
FIG. 5 is a flowchart illustrating an operation example of the detection system according to the first embodiment.

Next, an operation example of the detection system 1 will be described with reference to FIG. 5. The ECU 30 of the detection system 1 determines whether or not an accessary (ACC) power supply or an ignition (IG) power supply is turned on (Step S1). In a case where the ACC power supply or the IG power supply is in an on state (Step S1; Yes), the ECU 30 detects the detection device 20 by the RFID reader 10 (Step S2). For example, the ECU 30 transmits the transmission signal including the power supply signal and the carrier wave from the RFID reader 10 to the detection device 20 at a predetermined interval (for example, at an interval of 1 second). Next, the ECU 30 determines whether or not a response from the detection device 20 is made (Step S3). In a case where an external force due to a motion of the occupant is applied, and thus the first and second switch circuits 22R and 22L are in an on state, the detection device 20 operates so that the RFID detection circuit 23 and the loop antenna 21 are electrically connected to each other, and a gain of the loop antenna 21 is not reduced. In this case, the detection device 20 transmits a detection signal from the RFID detection circuit 23 to the RFID reader 10 through the loop antenna 21. In addition, in a case where an external force due to a motion of the occupant is not applied, and the first and second switch circuits 22R and 22L are in an off state, electrical connection between the RFID detection circuit 23 and the loop antenna 21 is shut down, and a gain of the loop antenna 21 is reduced, and thus the detection device 20 does not operate. In this case, the detection device 20 does not transmit the detection signal from the RFID detection circuit 23 to the RFID reader 10 through the loop antenna 21.

When receiving the detection signal from the detection device 20, the RFID reader 10 outputs an identifier of the detection signal that is received to the ECU 30. When the identifier is output from the RFID reader 10, the ECU 30 determines that a response is made from the detection device 20. In a case where it is determined that a response is made from the detection device 20 (Step S3; Yes), the ECU 30 determines a state of a detection target in the vehicle 2 on the basis of the identifier (Step S4). For example, the ECU 30 determines that an occupant sits on a seat 2a that is correlated with the identifier that is output from the RFID reader 10. Next, the ECU 30 determines whether or not the ACC power supply or the IG power supply is in an off state (Step S5). In a case where the ACC power supply or the IG power supply is in an off state (Step S5; Yes), the ECU 30 terminates the processing. In addition, in a case where the ACC power supply or the IG power supply is in an on state (Step S5; No), the ECU 30 returns to Step S2, and detects the detection device 20 by the RFID reader 10. Furthermore, in Step S1, in a case where the ACC power supply or the IG power supply is in an off state (Step S1; No), the ECU 30 terminates the processing. In addition, in Step S3, in a case where a response is not made from the detection device 20 (Step S3; No), the ECU 30 detects the detection device 20 again by the RFID reader 10 (Step S1, Step S2).

As described above, the detection device 20 according to the first embodiment includes the loop antenna 21, the RFID detection circuit 23, and the switch unit 22. The loop antenna 21 transmits and receives an electric wave including a signal. The RFID detection circuit 23 includes the first circuit terminal 23a and the second circuit terminal 23b which are connected to the loop antenna 21. The RFID detection circuit 23 operates by using the power supply signal that is included in the signal received by the loop antenna 21 as power, and outputs the detection signal to the loop antenna 21. The switch unit 22 performs switching to the gain reduction state in which the gain of the loop antenna 21 is reduced or the gain non-reduction state in which the gain of the loop antenna 21 is not reduced in correspondence with a state of a detection target. Here, when a wavelength of an electric wave is set to λ, the switch unit 22 includes the switch terminals 22a and 22b for reducing the gain of the loop antenna 21 within the range K1 on the loop antenna 21 from the first circuit terminal 23a to a position spaced away from the first circuit terminal 23a by λ/8 along the first extension direction of the loop antenna 21. In addition, the switch unit 22 includes the switch terminals 22d and 22e for reducing the gain of the loop antenna 21 within the range K2 on the loop antenna 21 from the second circuit terminal 23b to a position spaced away from the second circuit terminal 23b by λ/8 along the second extension direction of the loop antenna 21.

According to the configuration, the detection device 20 can completely electrically separate the loop antenna 21 and the RFID detection circuit 23 from each other in correspondence with a state of the detection target. According to this, the detection device 20 can set impedance of the RFID detection circuit 23 and the loop antenna 21 to mismatching, and it is possible to realize a gain reduction state in which the gain of the loop antenna 21 is reduced. According to this, the detection device 20 can invalidate the loop antenna 21 by lowering the reception sensitivity of the loop antenna 21, and the RFID detection circuit 23 may not operate even when the power supply signal is transmitted. In addition, the detection device 20 can electrically connect the loop antenna 21 and the RFID detection circuit 23 in correspondence with a state of the detection target. According to this, the detection device 20 can set the impedance of the RFID detection circuit 23 and the loop antenna 21 to matching, and it is possible to realize the gain non-reduction state in which the gain of the loop antenna 21 is not reduced. According to this, the detection device 20 does not lower the reception sensitivity of the loop antenna 21, and thus it is possible to validate the loop antenna 21, and it is possible to operate the RFID detection circuit 23 in accordance with the power supply signal. As a result, for example, the detection device 20 can suppress erroneous detection in which a detection signal is output regardless of sitting of the occupant on the seat 2a, and thus it is possible to improve detection accuracy of the detection target. The detection device 20 can further lower the reception sensitivity of the RFID detection circuit 23 by directly connecting the switch terminals 22a and 22d to the first and second circuit terminals 23a and 23b to shorten a conductor length on both ends of the RFID detection circuit 23. According to this, the detection device 20 can relatively shorten a distance from the RFID reader 10, and it is possible to enlarge a detection region.

In the detection device 20, the switch terminals 22a, 22b, 22d, and 22e are operation points for setting the RFID detection circuit 23 and the loop antenna 21 to a conduction state or a non-conduction state. According to the configuration, the detection device 20 can completely electrically separate the loop antenna 21 and the RFID detection circuit 23 from each other in correspondence with a state of a detection target, and thus it is possible to realize the gain reduction state.

In the detection device 20, the switch unit 22 includes the first switch circuit 22R that can switch the switch terminals 22a and 22b to the electrical connection state or the electrical non-connection state, and the second switch circuit 22L that can switch the switch terminals 22d and 22e to the electrical connection state or the electrical non-connection state. The switch unit 22 can switch the gain non-reduction state in which the switch terminals 22a and 22b are set to a connection state and the switch terminals 22d and 22e are set to a connection state, and the gain reduction state in which the switch terminals 22a and 22b are set to a non-connection state and the switch terminals 22d and 22e are set to a non-connection state. According to the configuration, the detection device 20 can completely electrically separate the loop antenna 21 and the RFID detection circuit 23 from each other in correspondence with a state of a detection target, and thus it is possible to realize the gain reduction state. In addition, the detection device 20 can electrically connect the loop antenna 21 and the RFID detection circuit 23 in correspondence with a state of a detection target, and thus it is possible to realize the gain non-reduction state.

The detection system 1 according to the first embodiment includes the RFID reader 10, the detection device 20, and the ECU 30. The RFID reader 10 transmits and receives an electric wave including a signal, and transmits a transmission signal including at least a power supply signal. The detection device 20 includes the loop antenna 21, the RFID detection circuit 23, and the switch unit 22. The loop antenna 21 transmits and receives a signal to and from the RFID reader 10. The RFID detection circuit 23 includes the first circuit terminal 23a and the second circuit terminal 23b which are connected to the loop antenna 21, operates by using the power supply signal included in the signal that is received by the loop antenna 21 as power, and outputs a detection signal to the loop antenna 21. The switch unit 22 performs switching to the gain reduction state in which the gain of the loop antenna 21 is reduced or the gain non-reduction state in which the gain of the loop antenna 21 is not reduced in correspondence with a state of a detection target. The ECU 30 is connected to the RFID reader 10 and determines a state of a detection target on the basis of the detection signal that is received by the RFID reader 10. Here, when a wavelength of an electric wave is set to λ, the switch unit 22 includes the switch terminals 22a and 22b for reducing the gain of the loop antenna 21 within the range K1 on the loop antenna 21 from the first circuit terminal 23a to a position spaced away from the first circuit terminal 23a by λ/8 along the first extension direction of the loop antenna 21. In addition, the switch unit 22 includes the switch terminals 22d and 22e for reducing the gain of the loop antenna 21 within the range K2 on the loop antenna 21 from the second circuit terminal 23b to a position spaced away from the second circuit terminal 23b by λ/8 along the second extension direction of the loop antenna 21. According to the configuration, the detection system 1 can obtain the same effect as in the detection device 20.

Modification Example of First Embodiment

Figure 6:
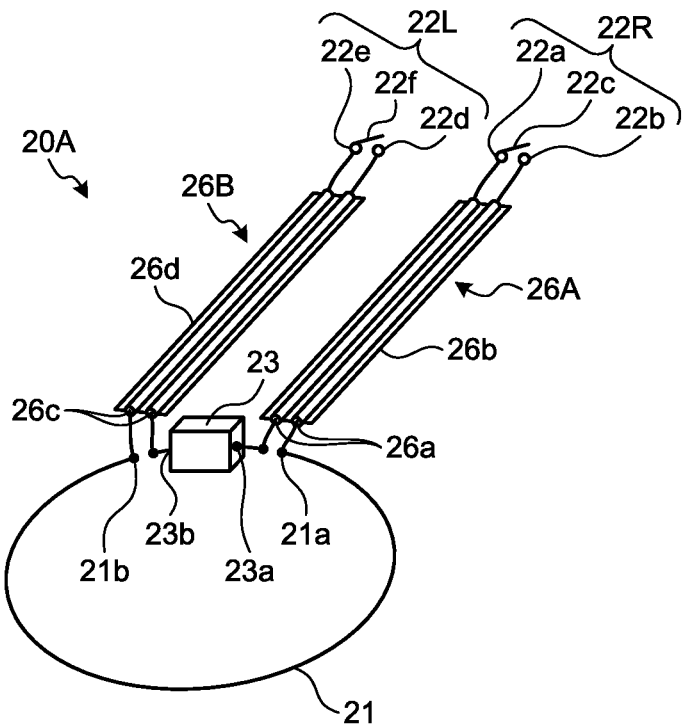
FIG. 6 is a schematic view illustrating a configuration example of a detection device according to a first modification example of the first embodiment.

Next, a detection device 20A according to a first modification example of the first embodiment will be described with reference to FIG. 6. Furthermore, in the first modification example of the first embodiment, the same reference numeral will be given to the same constituent element as in the first embodiment, and detailed description thereof will be omitted. The detection device 20A is different form the detection device 20 in the first embodiment in that the first and second switch circuits 22R and 22L are connected to the loop antenna 21 through electric wires 26A and 26B. The detection device 20A includes the loop antenna 21, the first and second switch circuits 22R and 22L, the electric wires 26A and 26B, and the RFID detection circuit 23. The electric wire 26A includes two conductors 26a, and a covering portion 26b that covers each of the conductors 26a. The conductors 26a extend along an extension direction. In one of the conductors 26a, one end is connected to the first circuit terminal 23a of the RFID detection circuit 23, and the other end is connected to the switch terminal 22a of the first switch circuit 22R. In the other conductor 26a, one end is connected to the starting end 21a of the loop antenna 21, and the other end is connected to the switch terminal 22b of the first switch circuit 22R. The conductors 26a are disposed to be adjacent to each other in a direction that intersects the extension direction. The conductors 26a are disposed to be adjacent to each other, and cancel at least a partial magnetic field that occurs due to a current that flows through each current path. That is, the conductors 26a cancel a magnetic field that occurs when a current flowing through one current path and a current flowing through the other current path flow in directions opposite to each other. According to this, the conductors 26a can suppress an influence of the magnetic field that is applied to the loop antenna 21.

Similarly, the electric wire 26B includes two conductors 26c, and a covering portion 26d that covers each of the conductors 26c. The conductors 26c extend along an extension direction. In one of the conductors 26c, one end is connected to the second circuit terminal 23b of the RFID detection circuit 23, and the other end is connected to the switch terminal 22d of the second switch circuit 22L. In the other conductor 26c, one end is connected to the termination end 21b of the loop antenna 21, and the other end is connected to the switch terminal 22e of the second switch circuit 22L. The conductors 26c are disposed to be adjacent to each other in a direction that intersects the extension direction. The conductors 26c are disposed to be adjacent to each other, and cancel at least a partial magnetic field that occurs due to a current that flows through each current path. That is, the conductors 26c cancel a magnetic field that occurs when a current flowing through one current path and a current flowing through the other current path flow in directions opposite to each other. According to this, the conductors 26c can suppress an influence of the magnetic field that is applied to the loop antenna 21.

As described above, in the detection device 20A according to the first modification example of the first embodiment, the first and second switch circuits 22R and 22L are connected to the loop antenna 21 through the electric wires 26A and 26B. According to the configuration, in the detection device 20A, the first and second switch circuits 22R and 22L can be provided separately from the loop antenna 21, and thus it is possible to improve the degree of freedom of design. In addition, the detection device 20A can suppress an influence that is applied to antenna characteristics of the loop antenna 21 by a magnetic field of the electric wires 26A and 26B, and thus it is possible to suppress deterioration of performance of the loop antenna 21.

Figure 7:
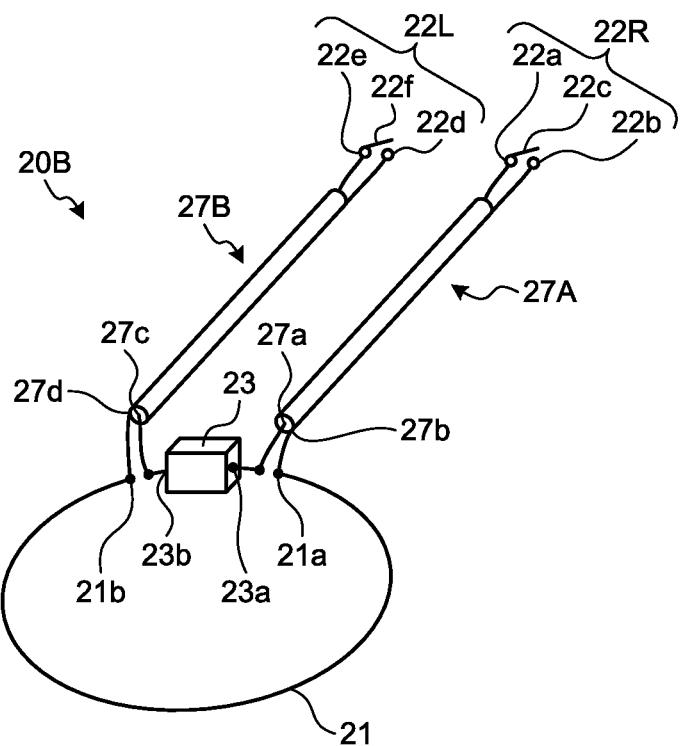
FIG. 7 is a schematic view illustrating a configuration example of a detection device according to a second modification example of the first embodiment.

Next, a detection device 20B according to a second modification example of the first embodiment will be described with reference to FIG. 7. The detection device 20B is different from the detection device 20 of the first embodiment in that the first and second switch circuits 22R and 22L are connected to the loop antenna 21 through coaxial cables 27A and 27B. The detection device 20B includes the loop antenna 21, the first and second switch circuits 22R and 22L, the coaxial cables 27A and 27B, and the RFID detection circuit 23. The coaxial cable 27A includes a core wire 27a, a shield braid 27b that is provided concentrically to the core wire 27a, and an insulator (not illustrated) that insulates the core wire 27a and the shield braid 27b. The coaxial cable 27A extends along an extension direction. In the core wire 27a, one end is connected to the first circuit terminal 23a of the RFID detection circuit 23, and the other end is connected to the switch terminal 22a of the first switch circuit 22R. In the shield braid 27b, one end is connected to the starting end 21a of the loop antenna 21, and the other end is connected to the switch terminal 22b of the first switch circuit 22R. The coaxial cable 27A traps a magnetic field when a current flows on an inner side of the shield braid 27b, and thus it is possible to suppress an influence of the magnetic field that is applied to the loop antenna 21.

Similarly, the coaxial cable 27B includes a core wire 27c, a shield braid 27d that is provided concentrically to the core wire 27c, and an insulator (not illustrated) that insulates the core wire 27c and the shield braid 27d. The coaxial cable 27B extends along an extension direction. In the core wire 27c, one end is connected to the second circuit terminal 23b of the RFID detection circuit 23, and the other end is connected to the switch terminal 22e of the second switch circuit 22L. In the shield braid 27d, one end is connected to the termination end 21b of the loop antenna 21, and the other end is connected to the switch terminal 22d of the second switch circuit 22L. The coaxial cable 27B traps a magnetic field when a current flows on an inner side of the shield braid 27d, and thus it is possible to suppress an influence of the magnetic field that is applied to the loop antenna 21.

As described above, in the detection device 20B according to the second modification example of the first embodiment, the first and second switch circuits 22R and 22L are connected to the loop antenna 21 through the coaxial cables 27A and 27B. According to the configuration, in the detection device 20B, the first and second switch circuits 22R and 22L can be provided separately from the loop antenna 21, and thus it is possible to improve the degree of freedom of design. In addition, the detection device 20B can suppress an influence that is applied to antenna characteristics of the loop antenna 21 by the coaxial cables 27A and 27B, and thus it is possible to suppress deterioration of performance of the loop antenna 21.

Figure 8:
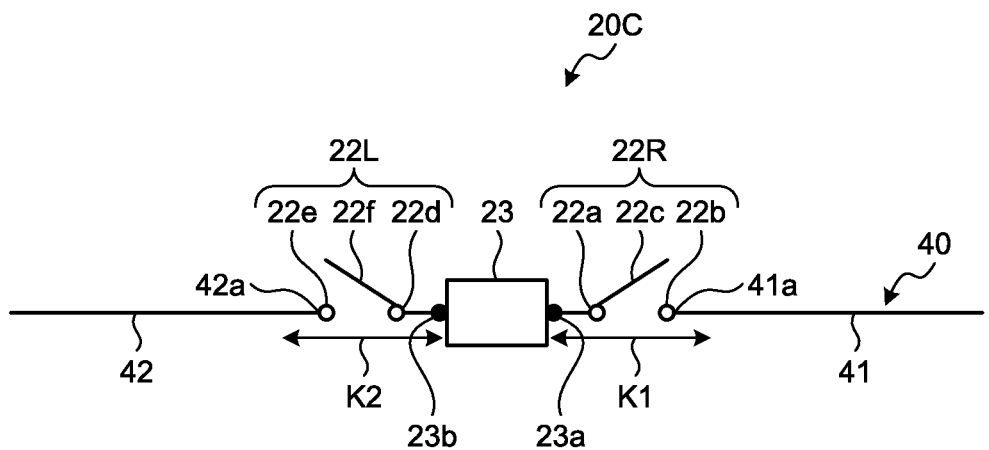
FIG. 8 is a schematic view illustrating a configuration example of a detection device according to a third modification example of the first embodiment.

Next, a detection device 20C according to a third modification example of the first embodiment will be described with reference to FIG. 8. The detection device 20C is different from the detection device 20 of the first embodiment in that a dipole antenna 40 is provided instead of the loop antenna 21. The detection device 20C includes the dipole antenna 40, the first and second switch circuits 22R and 22L, and the RFID detection circuit 23. The dipole antenna 40 includes a first element 41 and a second element 42, and transmits and receives an electric wave including a signal. The first switch circuit 22R is provided between the first circuit terminal 23a of the RFID detection circuit 23 and one end 41a of the first element 41. The switch terminals 22a and 22b of the first switch circuit 22R is located within a range K1 on the dipole antenna 40 from the first circuit terminal 23a of the RFID detection circuit 23 to a position that is spaced away from the first circuit terminal 23a by $\lambda/8$ along a first extension direction of the dipole antenna 40. Here, "$\lambda$" is a wavelength of an electric wave that is received by the dipole antenna 40. In the first switch circuit 22R, the switch terminal 22a is connected to the first circuit terminal 23a of the RFID detection circuit 23, and the switch terminal 22b is connected to the one end 41a of the first element 41. The first switch circuit 22R switches the first circuit terminal 23a of the RFID detection circuit 23 and the one end 41a of the first element 41 to a conduction state or a non-conduction state.

The second switch circuit 22L is provided between the second circuit terminal 23b of the RFID detection circuit 23 and one end 42a of the second element 42. The switch terminals 22d and 22e of the second switch circuit 22L is located within a range K2 on the dipole antenna 40 from the second circuit terminal 23b of the RFID detection circuit 23 to a position that is spaced away from the second circuit terminal 23b by λ/8 along a second extension direction of the dipole antenna 40. In the second switch circuit 22L, the switch terminal 22d is connected to the second circuit terminal 23b of the RFID detection circuit 23, and the switch terminal 22e is connected to the one end 42a of the second element 42. The second switch circuit 22L switches the second circuit terminal 23b of the RFID detection circuit 23 and the one end 42a of the second element 42 to a conduction state or a non-conduction state.

For example, the detection device 20C sets the switch terminals 22a and 22b of the first switch circuit 22R to a non-connection state (OFF), and sets the switch terminals 22d and 22e of the second switch circuit 22L to a non-connection state (OFF) in correspondence with a state of a detection target, thereby performing switching to a gain reduction state in which the gain of the dipole antenna 40 is reduced. In addition, the detection device 20C sets the switch terminals 22a and 22b of the first switch circuit 22R to a connection state (ON), and sets the switch terminals 22d and 22e of the second switch circuit 22L to a connection state (ON) in correspondence with a state of the detection target, thereby performing switching to a gain non-reduction state in which the gain of the dipole antenna 40 is not reduced.

As described above, in the detection device 20C according to the third modification example of the first embodiment, the dipole antenna 40 and the RFID detection circuit 23 can completely electrically separated from each other in correspondence with a state of a detection target. According to this, the detection device 20C can realize the gain reduction state and can invalidate the dipole antenna 40. In addition, the detection device 20C can electrically connect the dipole antenna 40 and the RFID detection circuit 23 to each other in correspondence with a state of the detection target. According to this, the detection device 20C can realize a gain non-reduction state, and can validate the dipole antenna 40. As a result, the detection device 20C can improve detection accuracy of the detection target. The detection device 20C can further lower the reception sensitivity of the RFID detection circuit 23 by directly connecting the switch terminals 22a and 22d to the first and second circuit terminals 23a and 23b to shorten a conductor length on both ends of the RFID detection circuit 23. According to this, the detection device 20C can relatively shorten a distance from the RFID reader 10, and it is possible to enlarge a detection region.

Second Embodiment

Figure 9:
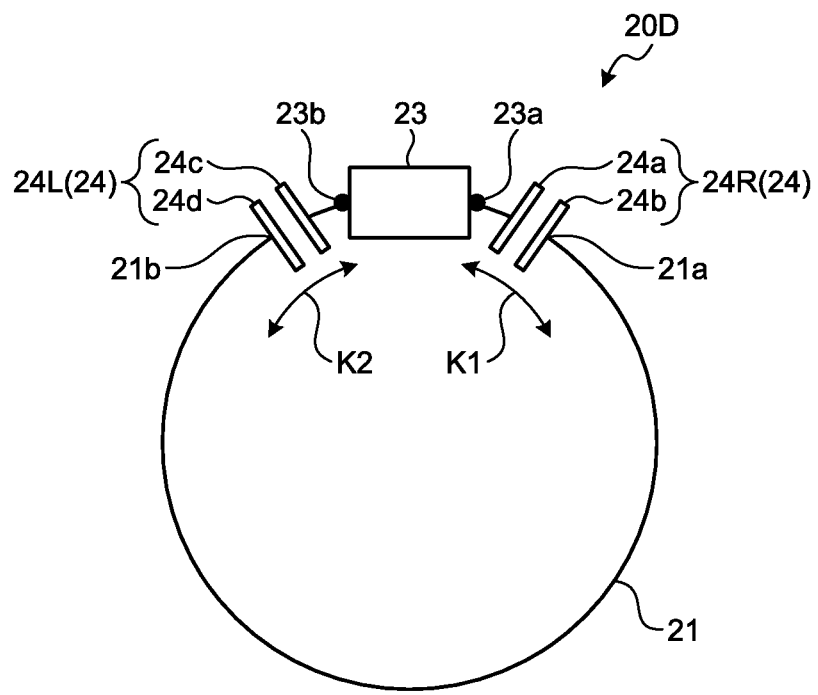
FIG. 9 is a schematic view illustrating a configuration example of a detection device according to a second embodiment.

Next, a detection device 20D according to a second embodiment will be described with reference to FIG. 9. Furthermore, in the second embodiment, the same reference numeral will be given to the same constituent element as in the first embodiment, and detailed description thereof will be omitted. The detection device 20D according to the second embodiment is different form the detection device 20 of the first embodiment in that a capacitor unit 24 is provided instead of the switch unit 22. The detection device 20D includes the loop antenna 21, the capacitor unit 24 as a gain reduction unit, and the RFID detection circuit 23. The capacitor unit 24 includes a first capacitor circuit 24R and a second capacitor circuit 24L. The first capacitor circuit 24R switches the loop antenna 21 to a gain reduction state or a gain non-reduction state. The first capacitor circuit 24R is provided between the first circuit terminal 23a of the RFID detection circuit 23, and the starting end 21a of the loop antenna 21. The first capacitor circuit 24R includes a flat plate 24a as a first flat plate, a flat plate 24b as a second flat plate, and a first flat plate drive mechanism (not illustrated). The pair of flat plates 24a and 24b functions as a first operation point for reducing the gain of the loop antenna 21. The pair of flat plates 24a and 24b is disposed to face each other, and is provided in a movable manner. The pair of flat plates 24a and 24b enters an electricity storage possible state that is a state capable of storing charges when approaching each other, and enters an electricity storage impossible state that is a state that cannot store charges when being spaced away from each other. The pair of flat plates 24a and 24b is located within a range K1 on the loop antenna 21 from the first circuit terminal 23a of the RFID detection circuit 23 to a position that is spaced away from the first circuit terminal 23a by λ/8 along the first extension direction of the loop antenna 21. One flat plate 24a is connected to the first circuit terminal 23a of the RFID detection circuit 23. The other flat plate 24b is connected to the starting end 21a of the loop antenna 21. The first flat plate drive mechanism performs switching to the electricity storage possible state by causing the pair of flat plates 24a and 24b to approach each other, and performs switching to the electricity storage impossible state by causing the pair of flat plates 24a and 24b to be spaced away from each other.

The second capacitor circuit 24L includes a flat plate 24c as a third flat plate, a flat plate 24d as a fourth flat plate, and a second flat plate drive mechanism (not illustrated). The pair of flat plates 24c and 24d functions as a second operation point for reducing the gain of the loop antenna 21. The pair of flat plates 24c and 24d is disposed to face each other, and is provided in a movable manner. The pair of flat plates 24c and 24d enters an electricity storage possible state that is a state capable of storing charges when approaching each other, and enters an electricity storage impossible state that is a state that cannot store charges when being spaced away from each other. The pair of flat plates 24c and 24d is located within a range K2 on the loop antenna 21 from the second circuit terminal 23b of the RFID detection circuit 23 to a position that is spaced away from the second circuit terminal 23b by λ/8 along the second extension direction of the loop antenna 21. One flat plate 24c is connected to the second circuit terminal 23b of the RFID detection circuit 23. The other flat plate 24d is connected to the termination end 21b of the loop antenna 21. The second flat plate drive mechanism performs switching into the electricity storage possible state by causing the pair of flat plates 24c and 24d to approach each other, and performs switching into the electricity storage impossible state by causing the pair of flat plates 24c and 24d to be spaced away from each other.

The detection device 20D sets the pair of flat plates 24a and 24b of the first capacitor circuit 24R to the electricity storage impossible state, and sets the pair of flat plates 24c and 24d of the second capacitor circuit 24L to the electricity storage impossible state in correspondence with a state of a detection target, thereby performing switching to the gain reduction state in which the gain of the loop antenna 21 is reduced. In addition, the detection device 20D sets the pair of flat plates 24a and 24b of the first capacitor circuit 24R to the electricity storage possible state and sets the pair of flat plates 24c and 24d of the second capacitor circuit 24L to the electricity storage possible state in correspondence with the state of the detection target, thereby performing switching to the gain non-reduction state in which the gain of the loop antenna 21 is not reduced.

As described above, the detection device 20D according to the second embodiment includes the first capacitor circuit 24R that can switch the pair of flat plates 24a and 24b to the electricity storage possible state or the electricity storage impossible state, and the second capacitor circuit 24L that can switch the pair of flat plates 24c and 24d to the electricity storage possible state or the electricity storage impossible state. The detection device 20D can switch the gain non-reduction state in which the pair of flat plates 24a and 24b is set to the electricity storage possible state and the pair of flat plates 24c and 24d is set to the electricity storage possible state, and the gain reduction state in which the pair of flat plates 24a and 24b is set to the electricity storage impossible state and the pair of flat plates 24c and 24d is set to the electricity storage impossible state from each other.

According to the configuration, the detection device 20D can completely electrically separate the loop antenna 21 and the RFID detection circuit 23 from each other in correspondence with a state of a detection target. According to this, the detection device 20D can realize the gain reduction state and can invalidate the loop antenna 21. In addition, the detection device 20D can electrically connect the loop antenna 21 and the RFID detection circuit 23 to each other in correspondence with a state of the detection target. According to this, the detection device 20D can realize the gain non-reduction state, and can validate the loop antenna 21. As a result, the detection device 20D can improve detection accuracy of the detection target. The detection device 20D uses the capacitor unit 24, and thus a contact point as in the switch unit 22 of the first embodiment is not necessary. As a result, it is possible to exclude contact failure. The detection device 20D can further lower the reception sensitivity of the RFID detection circuit 23 by directly connecting the flat plates 24a and 24c to the first and second circuit terminals 23a and 23b to shorten a conductor length on both ends of the RFID detection circuit 23. According to this, the detection device 20D can relatively shorten a distance from the RFID reader 10, and it is possible to enlarge a detection region.

Modification Example of Second Embodiment

Figure 10:
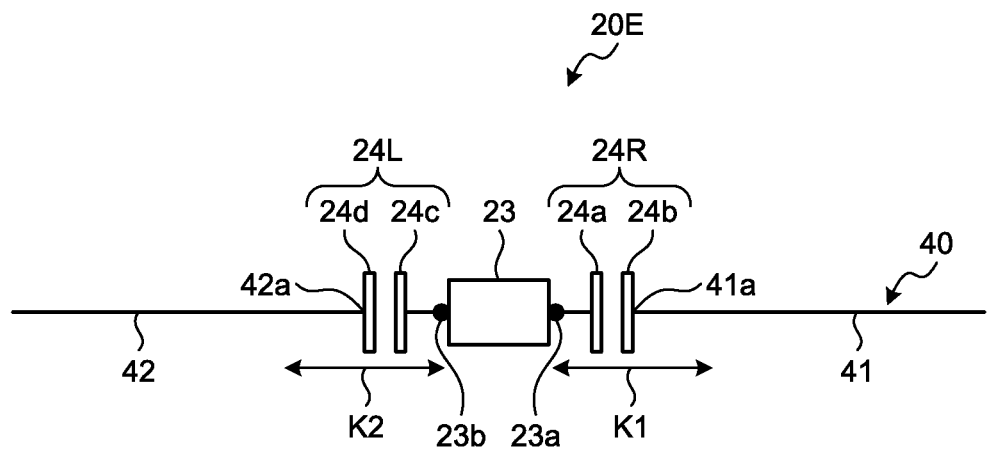
FIG. 10 is a schematic view illustrating a configuration example of a detection device according to a modification example of the second embodiment.

Next, a detection device 20E according to a modification example of the second embodiment will be described with reference to FIG. 10. The detection device 20E is different form the detection device 20D of the second embodiment in that the dipole antenna 40 is provided instead of the loop antenna 21. The detection device 20E includes the dipole antenna 40, the first and second capacitor circuits 24R and 24L, and the RFID detection circuit 23. The first capacitor circuit 24R is provided between the first circuit terminal 23a of the RFID detection circuit 23 and the one end 41a of the first element 41 of the dipole antenna 40. The pair of flat plates 24a and 24b of the first capacitor circuit 24R is located within a range K1 on the dipole antenna 40 from the first circuit terminal 23a of the RFID detection circuit 23 to a position that is spaced away from the first circuit terminal 23a by λ/8 along the first extension direction of the dipole antenna 40. In the first capacitor circuit 24R, the flat plate 24a is connected to the first circuit terminal 23a of the RFID detection circuit 23, and the flat plate 24b is connected to the one end 41a of the first element 41.

The second capacitor circuit 24L is provided between the second circuit terminal 23b of the RFID detection circuit 23 and the one end 42a of the second element 42. The pair of flat plates 24c and 24d of the second capacitor circuit 24L is located within a range K2 on the dipole antenna 40 from the second circuit terminal 23b of the RFID detection circuit 23 to a position that is spaced away from the second circuit terminal 23b by λ/8 along the second extension direction of the dipole antenna 40. In the second capacitor circuit 24L, the flat plate 24c is connected to the second circuit terminal 23b of the RFID detection circuit 23, and the flat plate 24d is connected to the one end 42a of the second element 42.

The detection device 20E sets the pair of flat plates 24a and 24b of the first capacitor circuit 24R to the electricity storage impossible state and sets the pair of flat plates 24c and 24d of the second capacitor circuit 24L to the electricity storage impossible state in correspondence with a state of a detection target, thereby performing switching to the gain reduction state in which the gain of the dipole antenna 40 is reduced. In addition, the detection device 20E sets the pair of flat plates 24a and 24b of the first capacitor circuit 24R to the electricity storage possible state and sets the pair of flat plates 24c and 24d of the second capacitor circuit 24L to the electricity storage possible state in correspondence with a state of the detection target, thereby performing switching to the gain non-reduction state in which the gain of the dipole antenna 40 is not reduced.

As described above, the detection device 20E according to the modification example of the second embodiment can completely electrically separate the dipole antenna 40 and the RFID detection circuit 23 in correspondence with a state of the detection target. According to this, the detection device 20E can realize the gain reduction state and can invalidate the dipole antenna 40. In addition, the detection device 20E can electrically connect the dipole antenna 40 and the RFID detection circuit 23 to each other in correspondence with a state of the detection target. According to this, the detection device 20E can realize a gain non-reduction state, and can validate the dipole antenna 40. As a result, the detection device 20E can improve detection accuracy of the detection target. The detection device 20E can further lower the reception sensitivity of the RFID detection circuit 23 by directly connecting the flat plates 24a and 24c to the first and second circuit terminals 23a and 23b to shorten a conductor length on both ends of the RFID detection circuit 23. According to this, the detection device 20E can relatively shorten a distance from the RFID reader 10, and it is possible to enlarge a detection region.

Third Embodiment

Figure 11:
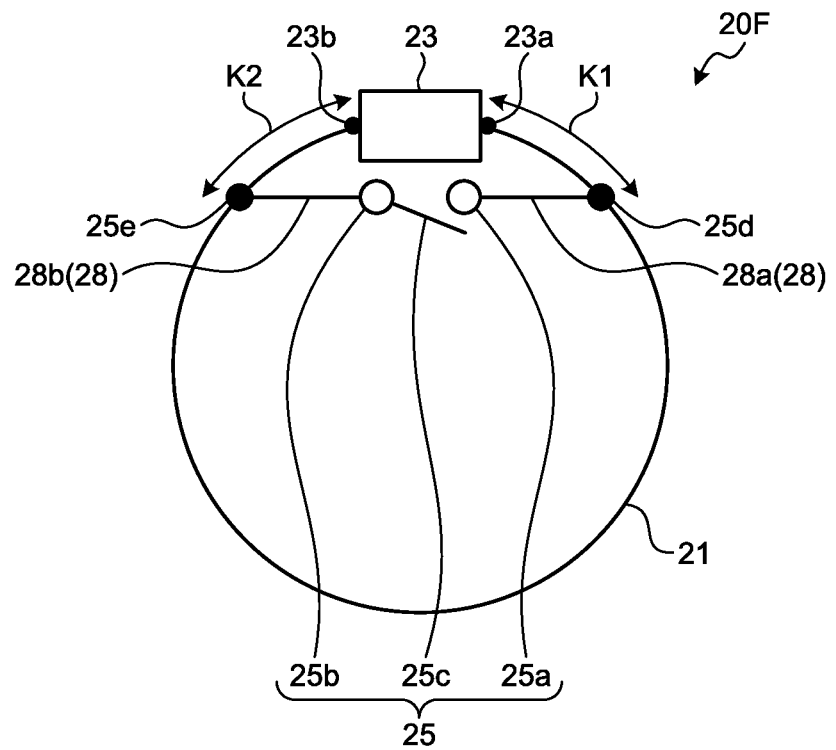
FIG. 11 is a schematic view illustrating a configuration example of a detection device according to a third embodiment.

Next, a detection device 20F according to a third embodiment will be described with reference to FIG. 11. Furthermore, in the third embodiment, the same reference numeral will be given to the same constituent element as in the first embodiment, and detailed description thereof will be omitted. The detection device 20F according to the third embodiment is different form the detection device 20 of the first embodiment in that conductors of the loop antenna 21 are connected to each other. The detection device 20F includes the loop antenna 21, a conductive wire portion 28, a switch circuit 25 as a gain reduction unit, a first connection point 25d as a first operation point, a second connection point 25e as a second operation point, and the RFID detection circuit 23. The first and second connection points 25d and 25e function as an operation point for reducing the gain of the loop antenna 21. The first connection point 25d is located within a range K1 on the loop antenna 21 from the first circuit terminal 23a of the RFID detection circuit 23 to a position that is spaced away from the first circuit terminal 23a by λ/8 along the first extension direction of the loop antenna 21. The second connection point 25e is located within a range K2 on the loop antenna 21 from the second circuit terminal 23b of the RFID detection circuit 23 to a position that is spaced away from the second circuit terminal 23b by λ/8 along the second extension direction of the loop antenna 21. The conductive wire portion 28 is connected to the first and second connection points 25d and 25e.

The conductive wire portion 28 connects conductors of the loop antenna 21 to each other. The conductive wire portion 28 is formed from a conductive member and includes conductive wires 28a and 28b. One end of the conductive wire 28a is connected to the first connection point 25d, and the other end thereof is connected to the switch terminal 25a of the switch circuit 25. One end of the conductive wire 28b is connected to the second connection point 25e, and the other end is connected to the switch terminal 25b of the switch circuit 25. The conductive wire portion 28 becomes conductive when the switch circuit 25 is turned on, and becomes non-conductive when the switch circuit 25 is turned off.

The switch circuit 25 switches electrical connection to ON or OFF. The switch circuit 25 is provided between the conductive wire 28a and the conductive wire 28b, and is connected to the RFID detection circuit 23 in parallel. The switch circuit 25 includes a switch terminal 25a, a switch terminal 25b, and a switching bar 25c. In the switch circuit 25, the switch terminal 25a is connected to the other end of the conductive wire 28a, and the switch terminal 25b is connected to the other end of the conductive wire 28b. The switching bar 25c switches the switch terminals 25a and 25b to an electrical connection state (ON) or an electrical non-connection state (OFF). That is, switching bar 25c switches the conductive wire 28a and the conductive wire 28b to a conduction state or a non-conduction state.

For example, the detection device 20F sets the switch terminals 25a and 25b of the switch circuit 25 the connection state (ON) in correspondence with a state of a detection target, thereby setting the conductive wire 28a and the conductive wire 28b to the conduction state, and setting antenna matching between the RFID detection circuit 23 and the loop antenna 21 to a mismatching state. In other words, the detection device 20F turns on the switch circuit 25 and sets impedance of the RFID detection circuit 23 and the loop antenna 21 to mismatching to switch the loop antenna 21 to the gain reduction state. The detection device 20F makes ON-resistance of the switch circuit 25 relatively small, thereby setting the impedance to mismatching in a more appropriate manner. For example, it is preferable that the ON-resistance of the switch circuit 25 is 1Ω or less. The detection device 20F sets the switch terminals 25a and 25b of the switch circuit 25 to a non-connection state (OFF) in correspondence with a state of the detection target, thereby setting the conductive wire 28a and the conductive wire 28b to a non-conduction state and setting antenna matching between the RFID detection circuit 23 and the loop antenna 21 to a matching state. In order words, the detection device 20F turns off the switch circuit 25, and sets impedance of the RFID detection circuit 23 and the loop antenna 21 to matching, thereby switching the loop antenna 21 to the gain non-reduction state.

As described above, the detection device 20F of the third embodiment includes the switch circuit 25 that can switch the first connection point 25d and the second connection point 25e to the electrical connection state or the electrical non-connection state. The switch circuit 25 can switch the gain non-reduction state in which the first connection point 25d and the second connection point 25e are set to the non-connection state, and the gain reduction state in which the first connection point 25d and the second connection point 25e are set to the connection state from each other.

According to the configuration, the detection device 20F can set impedance of the RFID detection circuit 23 and the loop antenna 21 to mismatching in correspondence with a state of the detection target. According to this, the detection device 20F can realize the gain reduction state and can invalidate the loop antenna 21. In addition, the detection device 20F can set the impedance of the RFID detection circuit 23 and the loop antenna 21 to matching in correspondence with a state of the detection target. According to this, the detection device 20F can realize the gain non-reduction state, and can validate the loop antenna 21. As a result, the detection device 20F can improve detection accuracy of the detection target.

Modification Example of Third Embodiment

Figure 12:
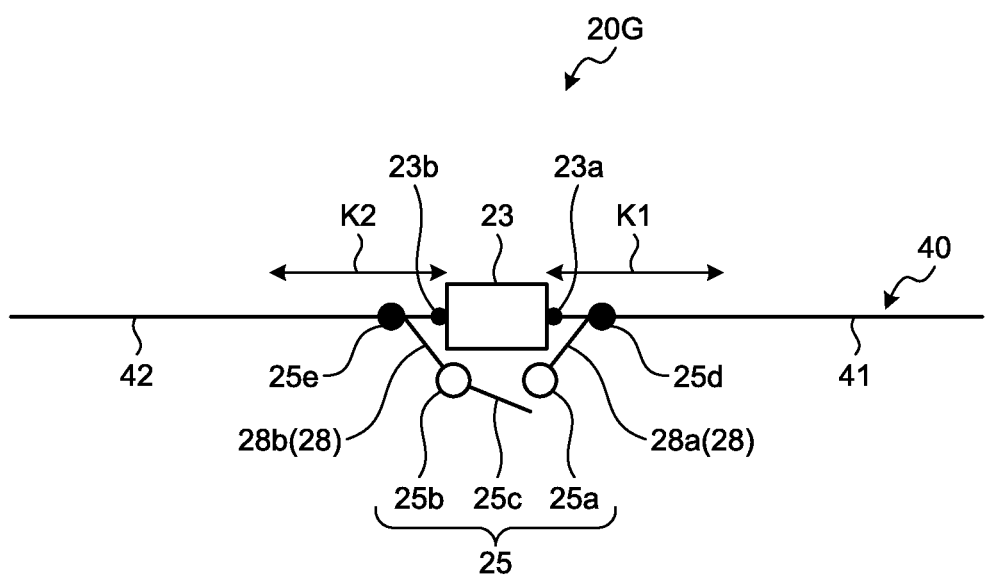
FIG. 12 is a schematic view illustrating a configuration example of a detection device according to a modification example of the third embodiment.

Next, a detection device 20G according to a modification example of the third embodiment will be described with reference to FIG. 12. The detection device 20G is different from the detection device 20F of the third embodiment in that the dipole antenna 40 is provided instead of the loop antenna 21. The detection device 20G includes the dipole antenna 40, the conductive wire portion 28, the switch circuit 25, the first connection point 25d, the second connection point 25e, and the RFID detection circuit 23. The first and second connection points 25d and 25e function as an operation point for reducing the gain of the dipole antenna 40. The first connection point 25d is located within a range K1 on the first element 41 from the first circuit terminal 23a of the RFID detection circuit 23 to a position that is spaced away from the first circuit terminal 23a by λ/8 in a first extension direction of the first element 41 of the dipole antenna 40. The second connection point 25e is located within a range K2 on the second element 42 from the second circuit terminal 23b of the RFID detection circuit 23 to a position that is spaced away from the second circuit terminal 23b by λ/8 in a second extension direction of the second element 42. The conductive wire portion 28 is connected to the first and second connection points 25d and 25e.

The conductive wire portion 28 connects conductors of the dipole antenna 40 to each other. One end of the conductive wire 28a of the conductive wire portion 28 is connected to the first connection point 25d, and the other end is connected to the switch terminal 25a of the switch circuit 25. One end of the conductive wire 28b is connected to the second connection point 25e and the other end is connected to the switch terminal 25b of the switch circuit 25. The conductive wire portion 28 becomes conductive when the switch circuit 25 is turned on, and becomes non-conductive when the switch circuit 25 is turned off.

For example, the detection device 20G sets the switch terminals 25a and 25b of the switch circuit 25 to a connection state (ON) in correspondence with a state of the detection target, thereby setting the conductive wire 28a and the conductive wire 28b to a conduction state, and performs switching to the gain reduction state in which the gain of the dipole antenna 40 is reduced. In addition, the detection device 20G sets the switch terminals 25a and 25b of the switch circuit 25 to a non-connection state (OFF) in correspondence with the state of the detection target, thereby setting the conductive wire 28a and the conductive wire 28b to a non-conduction state, and performing switching to the gain non-reduction state in which the gain of the dipole antenna 40 is not reduced.

As described above, the detection device 20G according to the modification example of the third embodiment can set impedance of the RFID detection circuit 23 and the dipole antenna 40 to mismatching in correspondence with a state of the detection target. According to this, the detection device 20G can realize the gain reduction state and can invalidate the dipole antenna 40. In addition, the detection device 20G can set the impedance of the RFID detection circuit 23 and the dipole antenna 40 to matching in correspondence with a state of the detection target. According to this, the detection device 20G can realize a gain non-reduction state, and can validate the dipole antenna 40. As a result, the detection device 20G can improve detection accuracy of the detection target.

Furthermore, description has been given of an example in which the antennas of the detection devices 20 to 20G are the loop antenna 21 or the dipole antenna 40, but the antennas may be an antenna such as a monopole antenna without limitation thereto.

In addition, with regard to the detection system 1, description has been given of an example in which the detection devices 20 are provided at the seating surface portions 2b of the seats 2a, and sitting of the occupant is determined, but there is no limitation thereto. For example, with regard to the detection system 1, each of the detection devices 20 may be provided in a buckle (not illustrated) of a seat belt, and fastening of the seat belt by the occupant may be determined. In this case, for example, in a case where the tongue plate of the seat belt is not attached to the buckle, the first and second switch circuits 22R and 22L are turned off, and the loop antenna 21 is set to the gain reduction state, and thus the RFID detection circuit 23 is not operated. In addition, in a case where the tongue plate is attached to the buckle, the first and second switch circuits 22R and 22L are turned on, and the loop antenna 21 is set to the gain non-reduction state, and thus the RFID detection circuit 23 is operated.

In addition, description has been given of an example in which the detection device 20 is mounted on the vehicle 2, but there is no limitation to the example. For example, the detection device 20 may be mounted on a ship, an aircraft, a building, and the like.

In addition, in the detection device 20C, the first and second switch circuits 22R and 22L may be connected to the dipole antenna 40 through the electric wires 26A and 26B (coaxial cables 27A and 27B). In the detection device 20D, the first and second capacitor circuits 24R and 24L may be connected to the loop antenna 21 through the electric wires 26A and 26B (coaxial cables 27A and 27B). In the detection device 20E, the first and second capacitor circuits 24R and 24L may be connected to the dipole antenna 40 through the electric wires 26A and 26B (coaxial cables 27A and 27B). In the detection device 20F, the switch circuit 25 may be connected to the loop antenna 21 through the electric wire 26A (coaxial cable 27A). In the detection device 20G, the switch circuit 25 may be connected to the dipole antenna 40 through the electric wire 26A (coaxial cable 27A).

In the detection device and the detection system according to the invention, a gain reduction unit has a first operation point for reducing a gain of an antenna within a range from a first circuit terminal of a signal output unit to a position that is spaced away from the first circuit terminal by $\lambda/8$, and a second operation point for reducing the gain of the antenna within a range from a second circuit terminal of the signal output unit to a position that is spaced away from the second circuit terminal by $\lambda/8$. According to this configuration, the detection device and the detection system can invalidate the antenna in correspondence with a state of a detection target, and it is possible to improve detection accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection device, comprising:
   an antenna that transmits and receives an electric wave including a signal;
   a signal output unit that includes a first circuit terminal and a second circuit terminal which are connected to the antenna, operates by using a power supply signal included in the signal that is received by the antenna as power, and outputs a detection signal to the antenna; and
   a gain reduction unit that performs switching to a gain reduction state in which a gain of the antenna is reduced or a gain non-reduction state in which the gain of the antenna is not reduced in correspondence with a state of a detection target, wherein
   when a wavelength of the electric wave is set as $\lambda$, the gain reduction unit includes a first operation point for reducing the gain of the antenna within a range on the antenna from the first circuit terminal to a position that is spaced away from the first circuit terminal by $\lambda/8$ along a first extension direction of the antenna, and a second operation point for reducing the gain of the antenna within a range on the antenna from the second circuit terminal to a position that is spaced away from the second circuit terminal by $\lambda/8$ along a second extension direction of the antenna.

2. The detection device according to claim 1, wherein the first and second operation points are operation points for setting the signal output unit and the antenna to a conduction state or a non-conduction state.

3. The detection device according to claim 2, wherein the gain reduction unit includes a first switch circuit that is capable of switching a first terminal and a second terminal as the first operation point to an electrical connection state or an electrical non-connection state, and a second switch circuit that is capable of switching a third terminal and a fourth terminal as the second operation point to the electrical connection state or the electrical non-connection state, and
   the gain non-reduction state in which the first terminal and the second terminal are set to the connection state, and the third terminal and the fourth terminal are set to the connection state, and the gain reduction state in which the first terminal and the second terminal are set to the non-connection state, and the third terminal and the fourth terminal are set to the non-connection state are capable of being switched from each other.

4. The detection device according to claim 2, wherein the gain reduction unit includes a first capacitor circuit capable of switching a first flat plate and a second flat plate as the first operation point to an electricity storage possible state or an electricity storage impossible state, and a second capacitor circuit capable of switching a third plate and a fourth plate as the second operation point to the electricity storage possible state or the electricity storage impossible state, and the gain non-reduction state in which the first flat plate and the second flat plate are set to the electricity storage possible state and the third flat plate and the fourth flat plate are set to the electricity storage possible state, and the gain reduction state in which the first flat plate and the second flat plate are set to the electricity storage impossible state and the third flat plate and the fourth flat plate are set to the electricity storage impossible state are capable of being switched from each other.

5. The detection device according to claim 1, wherein the gain reduction unit includes a first switch circuit that is capable of switching a first terminal and a second terminal as the first operation point to an electrical connection state or an electrical non-connection state, and a second switch circuit that is capable of switching a third terminal and a fourth terminal as the second operation point to the electrical connection state or the electrical non-connection state, and the gain non-reduction state in which the first terminal and the second terminal are set to the connection state, and the third terminal and the fourth terminal are set to the connection state, and the gain reduction state in which the first terminal and the second terminal are set to the non-connection state, and the third terminal and the fourth terminal are set to the non-connection state are capable of being switched from each other.

6. The detection device according to claim 1, wherein the gain reduction unit includes a first capacitor circuit capable of switching a first flat plate and a second flat plate as the first operation point to an electricity storage possible state or an electricity storage impossible state, and a second capacitor circuit capable of switching a third plate and a fourth plate as the second operation point to the electricity storage possible state or the electricity storage impossible state, and the gain non-reduction state in which the first flat plate and the second flat plate are set to the electricity storage possible state and the third flat plate and the fourth flat plate are set to the electricity storage possible state, and the gain reduction state in which the first flat plate and the second flat plate are set to the electricity storage impossible state and the third flat plate and the fourth flat plate are set to the electricity storage impossible state are capable of being switched from each other.

7. The detection device according to claim 1, wherein the gain reduction unit includes a third switch circuit capable of switching the first operation point and the second operation point to an electrical connection state or an electrical non-connection state, and the third switch circuit is capable of switching the gain non-reduction state in which the first operation point and the second operation point are set to the non-connection state, and the gain reduction state in which the first operation point and the second operation point are set to the connection state from each other.

8. A detection system, comprising:

a reading device that transmits and receives an electric wave including a signal, and transmits a transmission signal including at least a power supply signal;

a detection device including an antenna that transmits and receives a signal to and from the reading device, a signal output unit that includes a first circuit terminal and a second circuit terminal which are connected to the antenna, operates by using a power supply signal included in the signal that is received by the antenna as power, and outputs a detection signal to the antenna, and a gain reduction unit that performs switching to a gain reduction state in which a gain of the antenna is reduced or a gain non-reduction state in which the gain of the antenna is not reduced in correspondence with a state of a detection target; and a determination unit that is connected to the reading device, and determines a state of the detection target on the basis of the detection signal that is received by the reading device, wherein when a wavelength of the electric wave is set as $\lambda$, the gain reduction unit includes a first operation point for reducing the gain of the antenna within a range on the antenna from the first circuit terminal to a position that is spaced away from the first circuit terminal by $\lambda/8$ along a first extension direction of the antenna, and a second operation point for reducing the gain of the antenna within a range on the antenna from the second circuit terminal to a position that is spaced away from the second circuit terminal by $\lambda/8$ along a second extension direction of the antenna.

\* \* \* \* \*